United States Patent [19]

Harbison et al.

[11] 4,244,077
[45] Jan. 13, 1981

[54] CONNECTION FOR WINDSHIELD WIPER

[75] Inventors: William H. Harbison, Valparaiso; John J. Plisky, Munster; Michael G. Mohnach, Valparaiso, all of Ind.

[73] Assignee: The Anderson Company of Indiana, Gary, Ind.

[21] Appl. No.: 39,871

[22] Filed: May 17, 1979

[51] Int. Cl.³ .............................................. A47L 1/00
[52] U.S. Cl. ............................. 15/250.32; 15/250.42
[58] Field of Search ........... 15/250.32, 250.34, 250.35, 15/250.36, 250.42; 403/2, 107, 357

[56] References Cited

U.S. PATENT DOCUMENTS

| | | | |
|---|---|---|---|
| 3,750,227 | 8/1973 | Hayhurst | 15/250.32 |
| 3,875,611 | 4/1975 | Plisky | 15/250.32 |
| 3,883,919 | 5/1975 | Harbison | 15/250.32 |
| 4,023,232 | 5/1977 | Smithers | 15/250.32 |
| 4,118,825 | 10/1978 | Hoebrechts | 15/250.32 |

Primary Examiner—Edward J. McCarthy

Attorney, Agent, or Firm—Wegner, Stellman, McCord, Wiles & Wood

[57] ABSTRACT

A windshield wiper (10) is provided with parts for connecting a plastic windshield wiper blade assembly (11) to a wiper arm (14). The connecting parts include a side pin (30) carried by the wiper arm (14) having a keyway (75) at the end (71) thereof and a pin-receiving aperture (42) defined in a yoke (17) with a U-shaped spring (50) extending in chordal fashion through the aperture (42) and a key (66) projecting into the aperture (42). When the side pin (30) is fully inserted into the aperture (42), spring portions (57,58) will releasably seat in a reduced diameter constricted segment (69) of the side pin (30) to secure the yoke (17) on the wiper arm (14). If the side pin (30) is not fully inserted, engagement of the key (66) and the keyway (75) will lock the yoke (17) and the wiper arm (14) in skewed relation to prevent proper contact of a wiping element (27) carried by the yoke (17) with a windshield (16).

10 Claims, 8 Drawing Figures

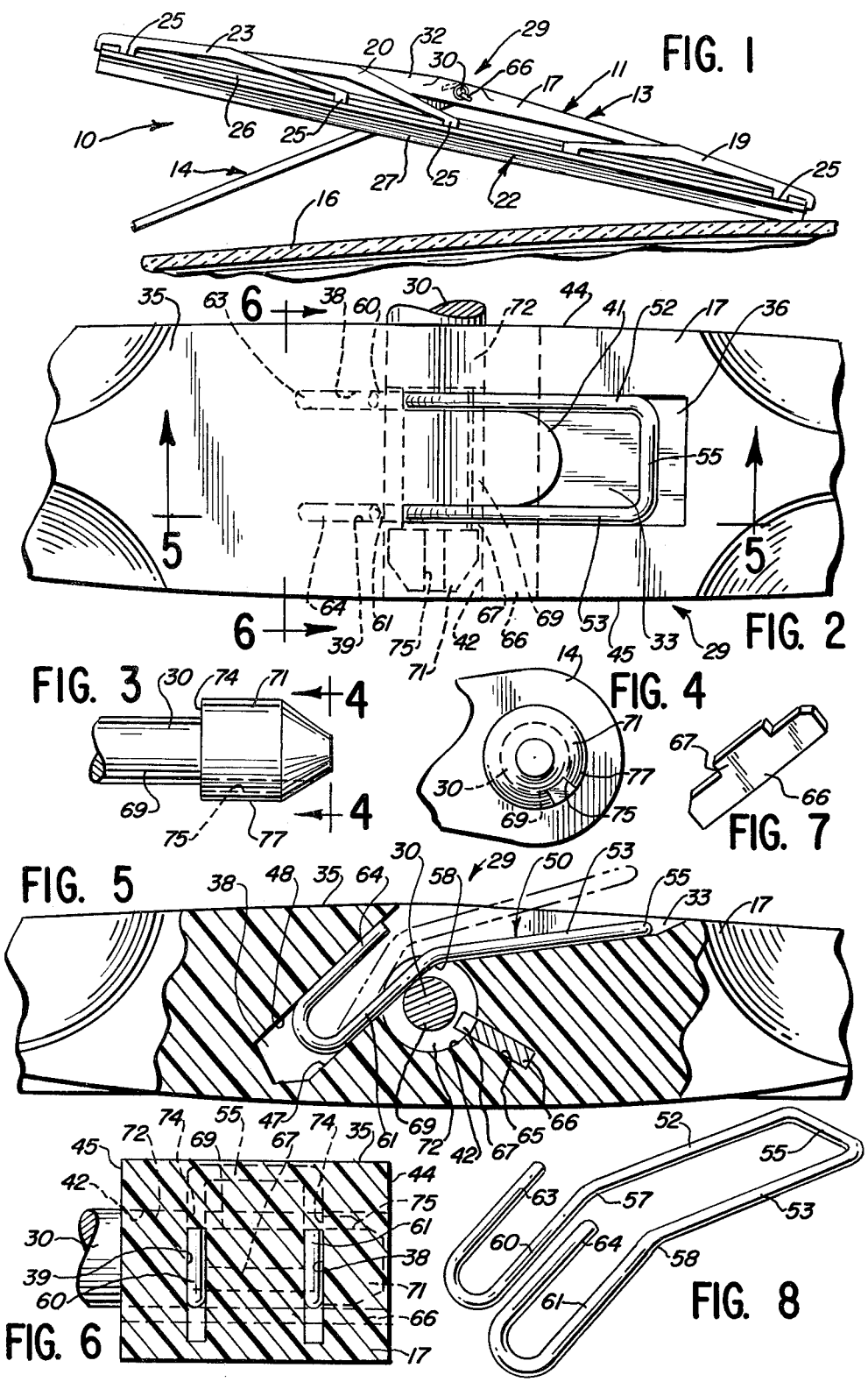

CONNECTION FOR WINDSHIELD WIPER

TECHNICAL FIELD

This invention relates to side mounted windshield wiper blades and, more particularly, to a connector on the blade for positively locking the blade properly to the side pin of a side pin windshield wiper arm.

BACKGROUND ART

Many connectors have been designed and patented for connecting a windshield wiper blade to the side pin of a side pin windshield wiper arm wherein the side pin has a reduced diameter intermediate portion bounded by an enlarged outer end portion and an enlarged inner end portion to define a groove area therebetween. Single spring clips have been provided for seating in the reduced diameter groove area of the side pin so as to retain the blade on the wiper arm. One such device is shown and described in U.S. Pat. No. 3,750,227 in the name of George Hayhurst et al wherein a single hairspring-type pin is seated in a slot in the yoke of a wiper blade and has a portion bridging across the aperture in the yoke so as to seat in the groove area of the wiper arm side pin. Another prior art device has a flat spring transversing the aperture in the bridge, which spring seats in the side pin groove area to hold the blade to the wiper arm. A still further prior art device is shown in U.S. Pat. No. 3,866,259 in the name of E. F. Nichols et al, assigned to the common assignee of the present application, wherein a U-shaped spring is secured in the channel-shaped metal yoke of the blade superstructure so that an intermediate shaped portion of the spring intersects aligned apertures between the side walls of a channel and will seat in the reduced diameter groove area of the side pin to secure the blade on the wiper arm. In this latter construction, if one spring leg ruptured or otherwise failed, the other spring leg would retain the blade on the side pin until remedial action could be taken.

The single hairspring has in some instances ruptured to release the blade from the wiper arm, while the flat spring did not always properly seat in the reduced diameter groove area of the side pin. With respect to the U-shaped spring construction, the spring had to be attached by special means and was not readily adaptable to a yoke formed from molded plastic material. In all of the aforementioned constructions, incomplete assembly of the blade to the wiper arm occasionally resulted since no means was provided to ensure that the wiper arm side pin was completely inserted to operative position within the yoke aperture. Further, no means was provided to ensure that the yoke did not disengage the side pin except when the spring was affirmatively deflected to release the side pin and the yoke was specifically located in a position relative to the side pin allowing withdrawal of the side pin from the yoke.

DISCLOSURE OF INVENTION

To overcome the problems of the prior art and to ensure a conscious effort to complete wiper blade to wiper arm assembly, a key and keyway are incorporated into the connection between the wiper arm side pin and the pin-receiving aperture of the blade yoke. A U-shaped spring is provided and has legs which overlap the yoke aperture such that when the side pin is seated in the aperture, the legs of the spring engage in the reduced diameter segment of the side pin with one leg bearing against each of the enlarged end segments. To ensure that both legs drop into engagement with the reduced diameter segment, the key projects into the aperture and is adapted to engage the keyway defined in the enlarged outer end segment of the side pin whenever the side pin is not fully inserted. The engagement of the key and the key-way locks up the wiper arm and the yoke in an inoperative position whereat the blade cannot be placed in wiping contact with a windshield. Thus, full assembly must be properly completed. When the side pin is fully inserted, the projecting key portion resides in the groove area defined by the reduced diameter segment to allow pivotal motion of the yoke about the side pin and permit the blade to be moved in flush wiping contact with the windshield. The key also functions to retain the yoke on the side pin even if both of the retaining spring legs rupture. The yoke may not be removed from the wiper arm unless the spring is manually deflected from the yoke aperture and the key and the keyway are axially aligned.

BRIEF DESCRIPTION OF DRAWINGS

FIG. 1 is an elevational view of a windshield wiper constructed in accordance with the present invention with the yoke and the wiper arm thereof being improperly partially assembled to thereby place the wiper blade in skewed relationship with the windshield;

FIG. 2 is an enlarged partial view of the yoke and the side pin of the wiper arm in fully assembled position;

FIG. 3 is an enlarged partial view of the outer end portion of the side pin removed from the yoke aperture;

FIG. 4 is an enlarged end view of the side pin as viewed from line 4—4 of FIG. 3;

FIG. 5 is an enlarged partial cross-sectional view of the yoke and the side pin taken along line 5—5 of FIG. 2;

FIG. 6 is an enlarged cross-sectional view of the side pin assembled with the blade taken along line 6—6 of FIG. 2;

FIG. 7 is a perspective view of the key removed from the yoke of the blade; and

FIG. 8 is a perspective view of the spring removed from the cavity in the yoke.

BEST MODE FOR CARRYING OUT THE INVENTION

Referring to the drawings, and particularly to FIG. 1, a windshield wiper, generally designated 10, is illustrated and is seen to include a wiper blade assembly 11 having a pressure-distributing superstructure 13 operatively connected with a wiper arm 14. In FIG. 1 only, the superstructure 13 is in skewed relation with the wiper arm 14 and hence in skewed relation with the windshield 16. This skewed relation results because the superstructure 13 and the wiper arm 14 are improperly only partially assembled thereby locking up the pivotal connection therebetween in a manner described in detail hereinafter.

The superstructure 13, as illustrated in FIG. 1, comprises a bridge or yoke 17 pivotally connected at one end portion to an intermediate portion of a secondary yoke 19 and is pivotally connected at the other end portion to a link 20, which link 20 has one end portion slidably connected to a wiper blade 22 and has the other end portion pivotally connected to the intermediate portion of a secondary yoke 23. The yokes 19 and 23 and the link 20 have facing claw members 25 at the ends thereof which slidably engage with the wiper blade backing strip 26 embedded in the sides of the rubber wiping element 27 as is fairly conventional construction being shown in U.S. Patent RE. 9,392 in the name of J. P. Moorhead et al. The yoke 17 has a connector portion 29 roughly centrally located with respect to the wiper blade 22, which connector portion 29 engages a connecting side pin 30 carried by the terminal end 32 of the wiper arm 14. The connector portion 29 and the side pin 30 are shown in more detail in FIGS. 2 through 7, inclusive.

The connecting portion 29 includes a cavity 33 molded into the yoke 17 through the top wall 35 thereof. The cavity 33 has a rectangular portion 36, as viewed from the top of the blade, on one end and becomes bifurcated into a pair of spaced apart channels 38 and 39 which are angled downwardly and away from the rectangular portion 36. The rectangular portion 36 of the cavity 33 has a circular wall 41 bridging between the spaced apart channels 38 and 39. The channels 38 and 39 cut across and open into a transverse aperture 42 formed through the yoke 17. The aperture 42 has an axis extending perpendicular to the side walls 44 and 45 of the yoke 17. As viewed in FIG. 5, the channels 38 and 39 have spaced apart walls 47 and 48, with the wall 48 aligning in an acute angle with respect to the top wall 35 of the yoke 17.

A U-shaped spring 50 is provided and includes a pair of spaced apart legs 52 and 53 which are interconnected by a connecting crosspiece 55 at one end thereof. The intermediate portions 57 and 58 of the legs 52 and 53 are bent at an angle so that the remote end portions 60 and 61 of the legs 52 and 53 form an acute angle with respect to the axis of the legs 52 and 53. Parts 63 and 64 of the end portions 60 and 61 of the legs 52 and 53 are bent back upon the end portions 60 and 61 so as to form U-shaped portions with the bent back parts 63 and 64 lying parallel to the end portions 60 and 61. The parts 63 and 64 and end portions 60 and 61, respectively, lie in planes containing the axis of the legs 52 and 53, which planes lie parallel to each other.

To assemble the spring 50 with the yoke 17, the end portions 60 and 61 are aligned with the channels 38 and 39 and are driven into the channels 38 and 39 until the ends of the parts 63 and 64 of the spring 50 bite into the walls 47 and 48 of the channels 38 and 39. At that point, the bent intermediate portions 57 and 58 of the legs 52 and 53 cut across the aperture 42 generally along a chord of the aperture 42 with the legs 52 and 53 disposed close to or on the surface of the rectangular portion 36 of the cavity 33 and with the crosspiece 55 lying in the rectangular portion 36 below the plane of the top wall 35 of the yoke 17.

A key 66, as shown in FIG. 7, is embedded in a slot 65, as shown in FIG. 5, and extends transversely across the yoke 17 and has a portion 67 which projects radially inward partially into the aperture 42 from a point generally opposite to the chords defined by the spring legs 52 and 53 and along a line angled relative to the plane of the top wall 35 of the yoke 17. The location of the key 66 in the aperture 42 in the yoke 17 relative to the spring legs 52,53 is only critical when compared with the location of the slot in pin 30 as will be explained hereinafter. The key 66 may be molded in place, may be glued or staked in place or may be seated in the desired location using any other known means.

This side pin 30 of the wiper arm 14 has an intermediate constricted segment 69 of reduced diameter which is bounded by an enlarged outer end segment 71 and an enlarged inner end segment 72 so that the groove area defined by the constricted segment 69 has abutting shoulders 74 defining each end thereof. The diameter of the end segment 71 or 72 is substantially equal to the diameter of the aperture 42. A keyway 75 of rectangular cross section is defined in the external surface 77 of the outer end segment 71 and extends axially between the outer and inner ends thereof being visible in the slope of the segment 71. The key portion 67 of the key 66 has a width less than the width of the keyway 75 and has a length less than the axial length of the side pin constricted segment 69 measured between the shoulders 74 of the outer and inner end segments 71 and 72. The key portion 67 projects radially inward a distance less than the height of the shoulders 74 measured between the external surfaces of the constricted segment 69 and the enlarged end segment 71 or 72, that is, the radius by which the constricted segment 69 is reduced with respect to the enlarged end segments 71 and 72.

With the side pin 30 axially aligned with the aperture 42 and the keyway 75 axially aligned with the key portion 67, the side pin 30 may be inserted fully into the aperture 42. When the side pin 30 is pushed into the aperture 42, the tapered outer end segment 71 of the side pin 30 will contact and then forcefully bias first the leg 52 and then the leg 53 upwardly with respect to the aperture 42 to permit the side pin 30 to pass through the aperture 42. When the shoulder 74 adjacent the outer end segment 71 of the side pin 30 passes the first leg 52, the first leg 52 will drop down into the groove area defined adjacent the constricted segment 69 and, upon further inward pushing of the side pin 30, the outer end segment 71 of the side pin 30 will clear the second leg 53 whereupon the second leg 53 of the spring 50 will drop into the groove area adjacent the constricted segment 69. The side pin 30 is then in a fully connected position with the two legs 52 and 53 positioned adjacent the constricted segment 69 of the side pin 30 and bearing against the shoulders 74 at the opposite ends thereof to prevent the side pin 30 from being removed from the aperture 42 in the yoke 17. The portion 67 of the key 66 will span between the shoulders 74 in the segment 69 permitting the blade to pivot freely on the pin 30.

It should be noted that the key 66 provides pull off resistance to restrict removal of the yoke 17 from the wiper arm 14. When the side pin 30 is in its fully connected position, the key portion 67 resides radially adjacent the constricted segment 69 within the groove area axially between the shoulders 74 of the enlarged end segments 71 and 72. In this position, the yoke 17 is pivotally mounted on the wiper arm 14 via the side pin 30 and is freely rotatable thereabout so that it may be moved from its position in FIG. 1 to a position at which the wiping element 27 may be placed into tangential contact with the windshield 16 (FIGS. 2, 5 and 6). When the wiping element 27 is in contact flush with the windshield 16, the wiper arm 14 and yoke 17 will generally be in side-by-side parallel relation.

If the side pin 30 is only partially inserted into the aperture 42, the portion 67 of the key 66 will be positioned within the keyway 75 of the end portion 71. In this condition, the yoke 17 is locked against rotation relative to the wiper arm 14. The vertical placement of the keyway 75 in the side pin 30 and the diagonal placement of the key 66 in the aperture 42 opposite the spring portions 57 and 58 causes the wiper arm 14 and the yoke 17 to be placed in an inoperative position with an angular displacement between the axes of the arm and blade being either between 20 and 50, as shown in FIG. 1, or between 120 and 150 degrees. In this position, the yoke 17 cannot be rotated to place the wiping element 27 in contact flush with the windshield 16. This, in effect, requires the assembler of the windshield wiper 10 to complete proper assembly of the yoke 17 to the wiper arm 14 by fully inserting the side pin 30 into the aperture 42 until both of the spring legs 52 and 53 drop into the channel area adjacent the constricted segment 69. The key 66, as shown in FIGS. 1 and 5, is visible on the side walls 44,45 of the yoke 17 and acts as a visual indicator of the location of the key portion 67. Likewise, the end of the keyway 75 shows in the tapered portion of the enlarged end 71 of the pin 30 so that an operator can visually align the keyway 75 with the key 66 to align the key portion 67 with the keyway 75.

It can be seen from an inspection of the drawings that if the wiper arm 14 and the yoke 17 were placed in side-by-side parallel relation, the angular displacement of the axis of the key portion 67 and the axis of the keyway 75 would be approximately 30 degrees. Any index of displacement would be sufficient for the purposes herein, but a preferred angular displacement is 20 degrees or more. If the blade is turned over side-to-side, the angular displacement would be approximately 120 degrees.

To remove the side pin 30, the key 66 and the keyway 75 are visual axially aligned and the crosspiece 55 is grasped to pivot the spring 50 to the dotted line position of FIG. 5 whereby the intermediate portions 57 and 58 of the legs 52 and 53 are removed from alignment with the aperture 42 whereupon the side pin 30 and the yoke 17 can be separated. Any attempt to remove the blade without aligning the key 66 with the keyway 75 will be frustrated by the key portion 67 abutting the shoulder 74 of the enlarged end 71.

INDUSTRIAL APPLICABILITY

It should be apparent that in using the improved construction, the wiper arm 14 and the yoke 17 must be completely assembled with the side pin 30 inserted fully into the aperture 42 and both spring legs 52 and 53 in undeflected locking position. Since partial assembly is readily visually apparent and renders the wiper blade assembly 11 completely inoperative, completion of assembly will always be induced. With both legs 52 and 53 of the spring 50 always engaged, should one leg of the spring 50 rupture, the other leg of the spring 50 will always be in place and retain the blade on the side pin 30 until appropriate remedial action can be taken. Further, due to the construction of the cavity 33 and the location of the spring 50 in the cavity 33, the side pin 30 is not able to work loose from the blade. The ends of the parts 63 and 64 of the spring legs 52 and 53 will bite into the walls 47 and 48 of the channels 38 and 39 of the cavity 33 and retain the spring 50 on the yoke 17.

We claim:

1. In a windshield wiper (10) including a wiper arm (14) and a wiper blade assembly (11) releasably mountable on the side of the wiper arm (14), the wiper arm (14) having a side pin (30) with a reduced diameter portion (69) between an enlarged outer end segment (71) and an enlarged inner end segment (72) and the wiper blade assembly (11) having a pressure-distributing yoke (17) with an aperture (42) therethrough for receiving the side pin (30), a means for securing the side pin (30) within the aperture (42) comprising a key (66) carried by the yoke (17) having a portion (67) projecting into the aperture (42) with a transverse length less than the axial length of the reduced diameter portion (69) of the side pin (30), a keyway (75) on the enlarged outer end segment (71) of the side pin (30) adapted to receive said key portion (67) therethrough, said key portion (67) passing through said keyway (75) when the side pin (30) is inserted into the aperture (42) to a fully connected position with the reduced diameter portion (69) of the side pin (30) adjacent the key portion (67), a U-shaped spring (50) having spaced legs (52,53) with the free ends of said legs (52,53) secured in the yoke (17), intermediate portions (57,58) of said legs (52,53) extending in chordal fashion across the aperture (42) of the yoke (17) and seated in the reduced diameter portion (69) of the side pin (30) when the side pin (30) is in connected position, and said spring (50) having at the opposite end of said legs (52,53) a connecting crosspiece (55) adapted to be raised for moving said intermediate portions (57,58) of said spring (50) out of alignment with the aperture (42) to release the side pin (30) for removal from the yoke (17).

2. The windshield wiper (10) of claim 1 wherein said key portion (67) and said keyway (75) are angularly displaced relative to one another when the wiper arm (14) and the yoke (17) are in side-by-side parallel relation, whereby a wiping element (27) carried by the yoke (17) will be placed in skewed relation with a windshield (16) when the side pin (30) has not been fully inserted into the aperture (42) to place the key portion (67) adjacent the reduced diameter segment (69) of the side pin (30).

3. The windshield wiper (10) of claim 1 wherein the yoke (17) has a cavity (33) in the top wall (35) thereof with spaced channel (38,39) aligned at an acute angle with said top wall (35) and intersecting the aperture (42) along a chord thereof, said key portion (67) projecting radially into the aperture (42) from a point generally opposite said chord, said keyway (75) when the wiper arm (14) and the yoke (17) are placed in side-by-side parallel relation being angularly displaced relative to the key portion (67), whereby a wiping element (27) carried by the yoke (17) will be placed in skewed relation with a windshield (16) when the side pin (30) has not been fully inserted into the aperture (42) to place the key portion (67) adjacent the reduced diameter segment (69) of the side pin (30).

4. The windshield wiper (10) of claim 3 wherein said angular displacement is between 20 and 50 degrees.

5. In a windshield wiper (10) including a wiper arm (14) and a wiper blade assembly (11) releasably mountable on the side of the wiper arm (14), the wiper arm (14) having a laterally extending connecting pin (30) with a constricted segment (69) between an enlarged outer end segment (71) and an enlarged inner end segment (72) and the wiper blade assembly (11) having a pressure-distributing yoke (17) with an aperture (42) extending transversely therethrough for receiving the connecting pin (30), a means for securing the connecting pin (30) within the aperture (42) comprising a key (66) carried by the yoke (17) having a portion (67) projecting into the aperture (42) with a transverse length less than the axial length of the constricted segment (69) of the connecting pin (30), a keyway (75) on the enlarged outer end segment (71) of the connecting pin (30) extends axially and is adapted to receive said key portion (67) therethrough, said key portion (67) passing through said keyway (75) when the connecting pin (30)

is inserted into the aperture (42) to a fully connected position with the constricted segment (69) of the connecting pin (30) radially aligned with said key portion (67), a cavity (33) in the top wall (35) of the yoke (17) and having spaced channels (38,39) intersecting along a chord with the aperture (42) of the yoke (17), a U-shaped spring (50) having spaced legs (52,53) with the free ends of said legs (52,53) secured in said channels (38,39) of said cavity (33), intermediate portions (57,58) of said legs (52,53) extending in chordal fashion across the aperture (42) of the yoke (17) and bearing on the constricted segment (69) of the connecting pin (30) when the connecting pin (30) is in connected position, and said spring (50) having a connecting crosspiece (55) at the opposite end of said legs (52,53), said crosspiece (55) being seated in said cavity (33) and being adapted to be raised for moving said intermediate portions (57,58) of said spring (50) out of alignment with the aperture (42) to release the connecting pin (30) for removal from the yoke (17) when the key portion (67) is aligned with the keyway (75).

6. The windshield wiper (10) of claim 5 wherein said key portion (67) and said keyway (75) are angularly displaced relative to one another when the wiper arm (14) and the yoke (17) are in side-by-side parallel relation, whereby a wiping element (27) carried by the yoke (17) will be placed in skewed relation with a windshield (16) when the connecting pin (30) has not been fully inserted into the aperture (42) to place the key portion (67) adjacent the constricted segment (69) of the side pin (30).

7. The windshield wiper (10) of claim 5 wherein said key portion (67) projects radially into the aperture (42) from a point generally opposite said chord, said keyway (75) when the wiper arm (14) and the yoke (17) are placed in side-by-side parallel relation being angularly displaced relative to the key portion (67), whereby a wiping element (27) carried by the yoke (17) will be placed in skewed relation with a windshield (16) when the connecting pin (30) has not been fully inserted into the aperture (42) to place the key portion (67) adjacent the constricted segment (69) of the connecting pin (30).

8. The windshield wiper (10) of claim 7 wherein said angular displacement is between 20 and 50 degrees.

9. In a windshield wiper (10) including a wiper arm (14) and a wiper blade assembly (11) releasably mountable on the side of the wiper arm (14), the wiper arm (14) having a side pin (30) with a reduced diameter portion (69) between an enlarged outer end segment (71) and an enlarged inner end segment (72) and the wiper blade assembly (11) having a pressure-distributing yoke (17) with an aperture (42) the re-through for receiving the side pin (30), a means for securing the side pin (30) within the aperture (42), said means having a portion (67) projecting into the aperture (42) with a transverse length less than the axial length of the reduced diameter portion (69) of the side pin (30), a keyway (75) on the enlarged outer end segment (71) of the side pin (30) adapted to receive said portion (67) therethrough, said portion (67) passing through said keyway (75) when the side pin (30) is inserted into the aperture (42) to a fully connected position with the reduced diameter portion (69) of the side pin (30) adjacent the portion (67), a U-shaped spring (50) having spaced legs (52,53) extending in chordal fashion across the aperture (42) of the yoke (17) and seated in the reduced diameter portion (69) of the side pin (30) when the side pin (30) is in connected position, and means for moving said intermediate portions (57,58) of said spring (50) out of alignment with the aperture (42) to release the side pin (30) for removal from the yoke (17) when the portion (67) aligns with the keyway (75).

10. The windshield wiper (10) of claim 9 wherein said portion (67) and said keyway (75) are angularly displaced relative to one another when the wiper arm (14) and the yoke (17) are in side-by-side parallel relation, whereby a wiping element (27) carried by the yoke (17) will be placed in skewed relation with a windshield (16) when the side pin (30) has not been fully inserted into the aperture (42) to place the portion (67) adjacent the reduced diameter segment (69) of the side pin (30).

* * * * *

UNITED STATES PATENT AND TRADEMARK OFFICE
CERTIFICATE OF CORRECTION

PATENT NO. : 4,244,077
DATED : January 13, 1981
INVENTOR(S) : William H. Harbison and John J. Plisky and Michael G. Mohnach It is certified that error appears in the above-identified patent and that said Letters Patent are hereby corrected as shown below:

On the title page of the patent under the heading "REFERENCES CITED U.S. PATENT DOCUMENTS", the following should be added:

3,378,874　　4/1968　　Scinta
　　　3,866,259　　2/1975　　Nichols et al.

Same heading, "FOREIGN PATENT DOCUMENTS", the following should be added:

German Publication 26 29 546, SWF
　　　German Publication 26 52 334, Bosch

Column 3, line 4, "RE. 9,392" should be --RE. 29,392--.
Column 8, line 12, "the re-through" should be --therethrough--.

Signed and Sealed this

Fourteenth Day of July 1981

[SEAL]

*Attest:*

*Attesting Officer*

GERALD J. MOSSINGHOFF

*Commissioner of Patents and Trademarks*